United States Patent
Murphy

(10) Patent No.: US 6,639,173 B1
(45) Date of Patent: Oct. 28, 2003

(54) ELECTRON BEAM WELDING METHOD PROVIDING POST-WELD HEAT TREATMENT

(75) Inventor: John Thomas Murphy, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/249,687

(22) Filed: Apr. 30, 2003

(51) Int. Cl.$^7$ ............................................... B23K 15/00
(52) U.S. Cl. ............................................... 219/121.14
(58) Field of Search ................. 219/121.12, 121.13, 219/121.14, 121.25, 121.26, 121.27, 121.35; 228/227, 230, 231; 29/889.2, 889.21

(56) References Cited

U.S. PATENT DOCUMENTS 4,566,810 A * 1/1986 Yoshioka et al.
6,364,971 B1 * 4/2002 Peterson, Jr. et al.

* cited by examiner

*Primary Examiner*—Samuel M. Heinrich
(74) *Attorney, Agent, or Firm*—Ernest Cusick; Gary M. Hartman; Domenica N. S. Hartman

(57) ABSTRACT

A method of forming a welded assembly, wherein an electron beam is used to form a weldment that joins two or more articles to form the welded assembly. The method involves directing a second electron beam onto the weldment in the wake of the welding beam, in a manner that inhibits precipitation of a solutioned precipitation-strengthening phase so as to reduce the incidence of strain-age cracking in the weldment.

8 Claims, 2 Drawing Sheets

ELECTRON BEAM WELDING METHOD PROVIDING POST-WELD HEAT TREATMENT

BACKGROUND OF INVENTION

1. Field of the Invention

The present invention generally relates to beam welding techniques. More particularly, this invention relates to a method of electron beam welding (EBW) in which two beams are projected to simultaneously perform both the welding operation and a post-weld heat treatment to reduce strain age cracking of the weld joint.

2. Description of the Related Art

High temperature iron, cobalt and nickel-based superalloys are widely used to form hot section components of gas turbine engines, including combustors and turbine vanes (nozzles) and blades (buckets). Circumstances exist where superalloy components are preferably or necessarily fabricated by welding. For example, components having complex configurations, such as turbine midframes, shroud support rings and steam turbine nozzle assemblies (boxes), can be more readily fabricated by welding castings together. Various techniques have been developed for welding superalloys. Tungsten inert gas (TIG) and plasma transferred arc (PTA) techniques are widely used in manual welding operations. For more demanding applications, such as weld joints having high aspect ratios, laser beam and electron beam (EB) welding processes have been developed. As known in the art, electron beam welding involves directing a beam of high-energy electrons on a joint between articles held in a vacuum. Electron beam welding techniques are particularly well suited for producing weld joints having high aspect ratios, as electron beam welding yields the deepest penetrations of any beam process, with very high aspect ratios of about ten to fifty being readily achieved. EB weld machines of about 30 to 50 kW capacity are not uncommon for this purpose.

Components for the hot sections of gas turbines are required to survive extended periods at high temperatures and stresses without excessive deformation. For this reason, these components are frequently made from nickel-base superalloys, which achieve good high temperature strength through precipitation hardening of $\hat{1}^3\hat{a}^{.2}$ (gamma prime) and $\hat{1}^3\hat{a}^{.2}\hat{a}^{.2}$ (gamma double prime) phases. The precipitation of these phases frequently exhibits "C-curve" kinetics. When stages of the precipitation process are plotted on temperature vs. time axes, as represented in FIG. 1, the resulting curve is C-shaped and exhibits a "nose" at the temperature at which precipitation is most rapid. C-curve behavior is typical for nucleation-and-growth type processes such as precipitation.

Superalloys capable of surviving very high temperatures are often designed to contain a high volume fraction of gamma prime. For these alloys, precipitation at temperatures near the nose of the C-curve is very rapid. When components made from precipitation-hardened alloys are welded, gamma prime and gamma double prime phases are dissolved in and near the weld (in the heat-affected zone, or HAZ). When the component later experiences high temperatures near the nose of the C-curve (the "aging range"), these phases can precipitate out again. This strengthening process can take place more rapidly than the relaxation of residual stresses which remain from welding. The weld and surrounding area are thus incapable of accommodating the strains required to relieve the residual stresses, and the weld or HAZ cracks. This phenomenon is known as strain age cracking.

One approach which has been advanced to prevent strain age cracking is to heat the weldment and surrounding area to the particular alloy's stress-relief temperature at a rate which is sufficiently rapid so that the strengthening phases do not have time to precipitate out. On the time-temperature curve of FIG. 1, this approach follows the upper heating curve that avoids the nose of the C-curve. However, as represented by the lower curve in FIG. 1, this solution is impractical when using traditional heating methods for relatively large components having significant thermal mass. Alternatives to post-weld stress relief have been developed to facilitate welding alloys that are prone to strain age cracking. For example, the Welding Institute (TWI), Cambridge, Great Britain, has developed a proprietary process for diverting a portion of an electron beam of an EB welder, enabling two separate beams to be independently directed on a component. The TWI process has been particularly developed to reduce the incidence of strain age cracking through two mechanisms. A first is to use the diverted beam to pre-heat the area to be welded ahead of the welding beam. Cracking is lessened due to the lower strength of the material at these temperatures, as well as due to the smaller temperature differential between the molten weld and the surrounding part. The second mechanism is to use the diverted beam to heat the component around the location of the welding beam. This technique is said to effect a thermal strain distribution that results in the weld being in a state of compressive residual strain when complete, reducing the incidence of cracking during post-weld heat treatment.

SUMMARY OF INVENTION

The present invention provides a method of forming a welded assembly, wherein an electron beam is used to form a weldment that joins two or more articles to form the assembly. The method is particularly directed to projecting a second electron beam onto the weldment in the wake of the welding beam, and in a manner that reduces strain-age cracking in the weldment.

The electron beam welding method of this invention generally comprises placing together two or more articles to define at least one contact surface interface therebetween. According to a preferred aspect of the invention, the articles are formed of alloys containing at least one precipitation-strengthening phase, such as a nickel-based superalloy containing gamma prime and/or gamma double prime precipitates. A first electron beam is caused to travel along the interface to form a weldment that joins the articles together, while a second electron beam is selectively directed at a portion of the weldment behind the first electron beam. According to another preferred aspect of the invention, the first and second electron beams are formed by splitting a third electron beam. The precipitation-strengthening phase is dissolved by the first electron beam so as to be substantially absent in the weldment. The second electron beam is at a sufficient power density and directed on the weldment an appropriate distance from the first electron beam so that the weldment is heated to a stress-relief temperature of the alloy and at a rate sufficient to avoid precipitation of the precipitation-strengthening phase. In this manner, the electron beam welding method of this invention results in the weldment and surrounding area being stress-relieved almost immediately after the weldment is formed, resulting in a welded assembly that is resistant to strain age cracking.

Other objects and advantages of this invention will be better appreciated from the following detailed description.

DETAILED DESCRIPTION

Figure 1:
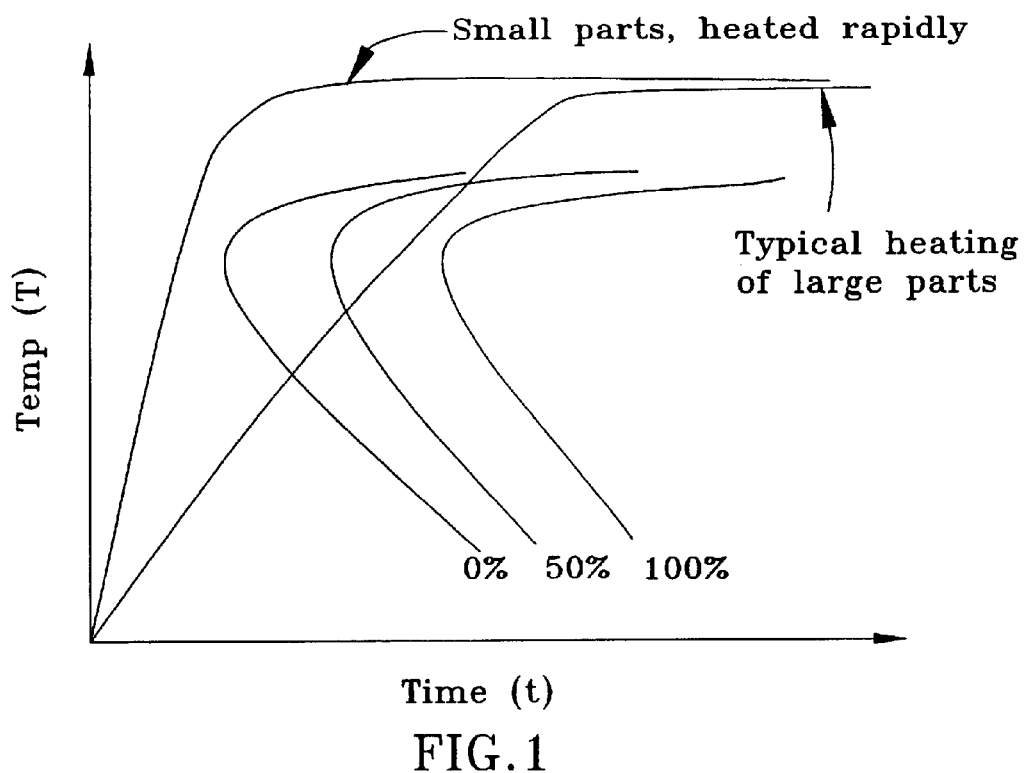
FIG. 1 is a temperature versus time graph representing the C-curve kinetics typical of precipitation-strengthened alloys, and the influence that size has on the ability to heat treat a component in order to avoid precipitation of precipitation-strengthening phase(s).
Figure 2:
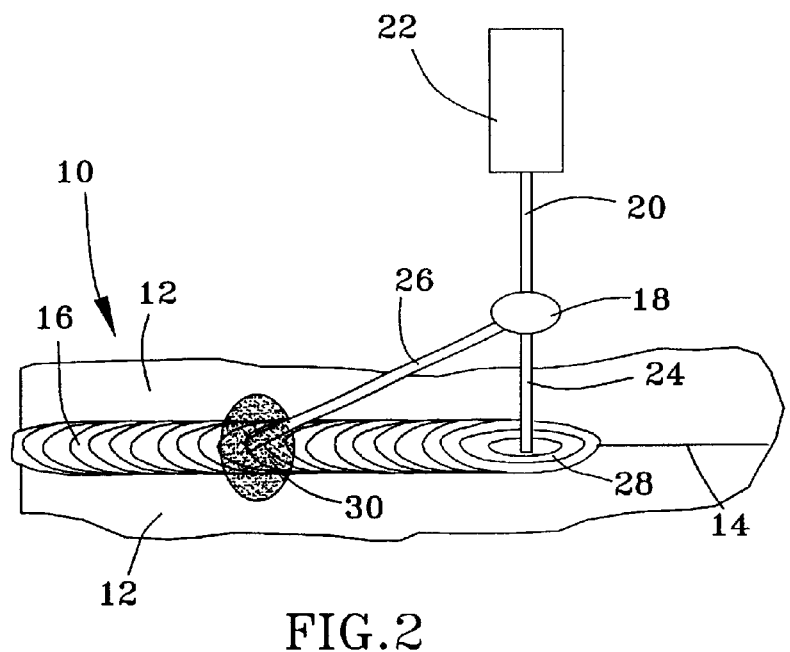
FIG. 2 schematically represents a split electron beam welding system in accordance with the present invention.

The present invention makes use of an electron beam welding system represented in FIG. 2. The welding system is shown as performing a welding operation on a pair of components 12, by which an electron beam 24 is directed at an interface 14 formed by opposing surfaces of the components 12 to produce a weldment 16 that metallurgically joins the components 12 to form a welded assembly 10. The components 12 may be formed of a variety of metal alloys, including those that are relatively difficult to weld, such as precipitation-strengthened nickel-based superalloys used to form cast components of gas turbine engines. Particularly notable superalloys include a gamma prime-strengthened nickel-based superalloy known as RenA© N5, which has a nominal composition, in weight percent, of 7.5% cobalt, 7.0% chromium, 6.5% tantalum, 6.2% aluminum, 5.0% tungsten, 3.0% rhenium, 1.5% molybdenum, 0.15% hafnium, 0.05% carbon, 0.004% boron, 0.01% yttrium, the balance nickel and incidental impurities. While the advantages of the invention will be discussed in reference to precipitation-strengthened superalloys, it is foreseeable that other benefits could be obtained by applying the method of this invention to other alloys.

As shown in FIG. 2, the electron beam 24 is one of two beams 24 and 26 that are split from an electron beam 20 generated by an electron beam gun 22. The beam 24 is shown as traveling in a downward direction as viewed in FIG. 2, and is at a sufficient power density to form the weldment 16. The second beam 26 is traveling in the same general direction as the "welding" beam 24, but is selectively projected onto a portion 30 of the weldment 16 behind the location 28 on which the welding beam 24 is being projected at the instant depicted in FIG. 2. As discussed below, the second beam 26 is at a sufficient power density to perform a localized heat treatment on the weldment 16 and the HAZ immediately surrounding the weldment 16, and follows sufficiently close to the welding beam 24 to minimize cooling of the weldment 16 prior to the heat treatment. According to the invention, the heat treatment performed with the second "treatment" beam 26 is desired to be sufficient to avoid the formation of strain age cracks in and around the weldment 16 when the welded assembly 10 later experiences high temperatures where strengthening phases dissolved during the welding operation can reprecipitate.

Splitting of the original beam 20 to form two separate beams 24 and 26 can be performed by a splitting device 18 of a type known in the art, e.g., similar to those used in the past to preheat weld joint interfaces, as practiced by TWI. However, the split beams 24 and 26 could be split from the beam 20 with other various devices and techniques, and more than one treatment beam 26 could be projected at multiple locations behind the welding beam 24. Alternatively, the welding beam 24 and one or more treatment beams 26 could be generated by separate electron beam guns. However, a drawback to this approach would be the requirement to maintain separate guns and to coordinate the targeting of their beams. The required power densities of the welding and treatment beams 24 and 26 will depend in part on the thermal mass of the components 12 and the materials from which the components 12 are formed. Generally, the welding beam 24 is preferably at a higher power density than the treatment beam 26. It is foreseeable that the diameters of the beams 24 and 26 may differ, and the treatment beam 26 may be oscillated to increase its coverage.

In an investigation leading up to this invention, nine pairs of coupons formed of a gamma prime-strengthened nickel-based superalloy were welded together by a bead-on-plate electron beam wire feed (EBWF) technique. The electron beam welder was operated so that the peak welding temperature was sufficient to dissolve the game prime precipitates in and near the weld joints. Immediately following welding, eight of the nine welded pairs of coupons were quickly transferred to a preheated oven to minimize the temperature drop of the weldments. The ninth coupon pair was not heat treated following welding, but instead allowed to cool by natural convention to room temperature (about 25 Â° C.).

Figure 3:
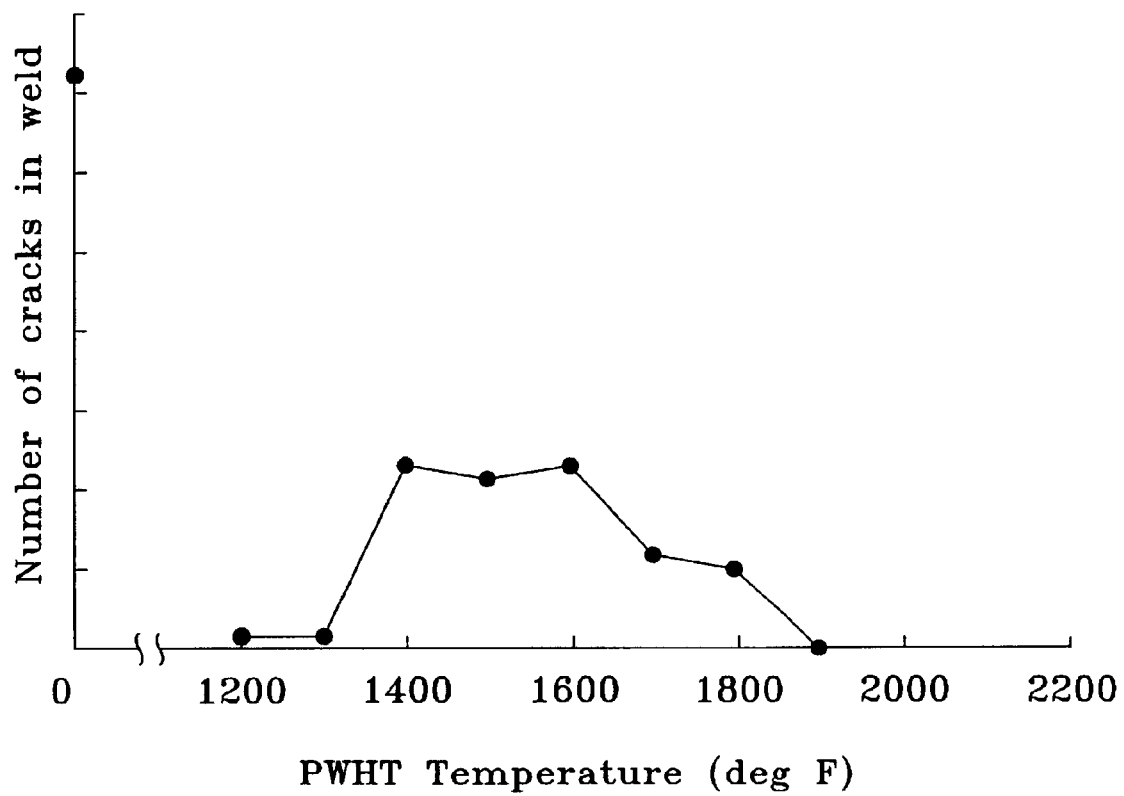
FIG. 3 is a graph evidencing the ability to avoid strain age cracking in an electron beam-welded superalloy assemblies by heating the weldment to a sufficient stress-relief temperature immediately after welding, and at a sufficient rate to avoid precipitation of a precipitation-strengthening phase.

For those coupon pairs subjected to post-weld heat treatment (PWHT), their heat treatment ovens were preheated to a temperature of about 1200 Â° F. (about 650 Â° C.), 1300 Â° F. (about 705 Â° C.), 1400 Â° F. (about 760 Â° C.), 1500 Â° F. (about 815 Â° C.), 1600 Â° F. (about 870 Â° C.), 1700 Â° F. (about 930 Â° C.), 1800 Â° F. (about 980 Â° C.) or 1900 Â° F. (about 1040 Â° C.), with progressively higher oven temperatures providing progressively higher heating rates. Following heat treatment of the eight coupon pairs, all nine coupon pairs were heated to a temperature at a sufficiently low rate to allow for reprecipitation of the gamma prime phase in the weld joints. The coupon pairs were again allowed to cool to room temperature and examined for the presence of strain age cracks. As evidence from FIG. 3, the coupon pair that did not undergo post-weld heat treatment (plotted as having a PWHT temperature of 0") was found to have a relatively large number of strain age cracks. Those coupon pairs heat treated at 1400 Â° F. to about 1800 Â° F. exhibited fewer yet a still significant number of cracks, while those heat treated at about 1200 Â° F. and 1300 Â° F. exhibited the least number of cracks for those exhibiting strain age cracking. In contrast, the coupon pair heat treated at about 1900 Â° F. (about 1040 Â° C.) did not exhibit any cracking, evidencing that the post-weld heating rate was sufficient to entirely avoid the nose of the C-curve for the tested superalloy. As such, these results evidenced that the use of an appropriate heat treatment quickly following after electron beam welding could avoid the incidence of strain age cracking.

From these results, it was concluded that a suitable heat treatment could be performed with a second electron beam that immediately follows the welding beam if the weldment was subjected to the second beam before cooling excessively, and if the second beam is of sufficient power density to rapidly heat the weldment to a suitable stress-relief temperature for the particular alloy.

While the invention has been described in terms of a preferred embodiment, it is apparent that other forms could be adopted by one skilled in the art. Therefore, the scope of the invention is to be limited only by the following claims.

What is claimed is:

1. An electron beam welding method comprising the steps of:

placing together articles to define a contact surface interface therebetween, the articles being formed of alloys containing at least one precipitation-strengthening phase;

directing a first electron beam along the contact surface interface to form a weldment that joins the articles together at the contact surface interface and thereby form a welded component, the precipitation-strengthening phase being dissolved by the first electron beam so as to be substantially absent in the weldment; and directing a second electron beam at a portion of the weldment behind the first electron beam, the second electron beam being at a sufficient power density and being directed at a distance from the first electron beam so that the portion of the weldment is heated to a stress-relief temperature of the weldment at a rate sufficient to avoid precipitation of the precipitation-strengthening phase.

2. An electron beam welding method according to claim 1, wherein the first and second electron beams are formed by splitting a third electron beam.

3. An electron beam welding method according to claim 1, wherein the first electron beam is at a higher power density than the second electron beam.

4. An electron beam welding method according to claim 1, wherein the alloys are nickel-based superalloys and the precipitation-strengthening phase comprises gamma prime precipitates.

5. An electron beam welding method according to claim 1, wherein the alloys are nickel-based superalloys and the precipitation-strengthening phase comprises gamma double prime precipitates.

6. An electron beam welding method according to claim 1, wherein the component is a gas turbine engine component.

7. A method of forming a gas turbine engine component by electron beam welding, the method comprising the steps of:

placing together articles to define a contact surface interface therebetween, the articles being formed of nickel-based superalloys containing at least one precipitation-strengthening phase selected from the group consisting of gamma prime precipitates and gamma double prime precipitates;

generating an electron beam; and splitting the electron beam to form first and second split electron beams, the first split electron beam being directed along the contact surface interface to form a weldment that joins the articles together at the contact surface interface and thereby form the component, the precipitation-strengthening phase being dissolved by the first split electron beam so as to be substantially absent in the weldment, the second split electron beam being directed at a portion of the weldment behind the first split electron beam, the second split electron beam being at a sufficient power density and being directed at a distance from the first split electron beam so that the portion of the weldment is heated to a stress-relief temperature of the weldment at a rate sufficient to avoid precipitation of the precipitation-strengthening phase.

8. An electron beam welding method according to claim 7, wherein the first split electron beam is at a higher power density than the second split electron beam.

* * * * *